United States Patent
Lee (10) Patent No.: US 10,150,034 B2
(45) Date of Patent: Dec. 11, 2018

(54) METHODS AND SYSTEMS FOR MERGING REAL WORLD MEDIA WITHIN A VIRTUAL WORLD

(71) Applicant: Charles Chungyohl Lee, Austin, TX (US)

(72) Inventor: Charles Chungyohl Lee, Austin, TX (US)

( * ) Notice: Subject to any disclaimer, the term of this patent is extended or adjusted under 35 U.S.C. 154(b) by 0 days.

(21) Appl. No.: 15/482,989

(22) Filed: Apr. 10, 2017

(65) Prior Publication Data

US 2017/0291107 A1    Oct. 12, 2017

Related U.S. Application Data

(60) Provisional application No. 62/320,669, filed on Apr. 11, 2016.

(51) Int. Cl.

| A63F 9/24 | (2006.01) |
|---|---|
| A63F 13/00 | (2014.01) |
| G06F 17/00 | (2006.01) |
| G06F 19/00 | (2018.01) |
| A63F 13/428 | (2014.01) |
| G06T 19/00 | (2011.01) |
| A63F 13/213 | (2014.01) |
| A63F 13/833 | (2014.01) |

(52) U.S. Cl.
CPC .......... *A63F 13/428* (2014.09); *A63F 13/213* (2014.09); *A63F 13/833* (2014.09); *G06T 19/006* (2013.01)

(58) Field of Classification Search
CPC .... A63F 13/428; A63F 13/213; A63F 13/537; A63F 13/833
See application file for complete search history.

(56) References Cited

U.S. PATENT DOCUMENTS

| 6,600,491 B1 * | 7/2003 | Szeliski | G06T 13/80 |
|---|---|---|---|
| | | | 345/421 |
| 8,114,172 B2 | 2/2012 | Givon | |
| 2002/0158873 A1 | 10/2002 | Williamson | |
| 2003/0228033 A1 | 12/2003 | Daniel et al. | |
| 2007/0035561 A1 | 2/2007 | Bachelder et al. | |
| 2008/0191864 A1 | 8/2008 | Wolfson | |
| 2009/0237564 A1 | 9/2009 | Kikinis et al. | |
| 2011/0008017 A1 | 1/2011 | Gausereide | |
| 2012/0092367 A1 | 4/2012 | Suzuki | |
| 2013/0172094 A1 | 7/2013 | Ueda | |
| 2013/0257877 A1 * | 10/2013 | Davis | A63F 13/12 |
| | | | 345/473 |

FOREIGN PATENT DOCUMENTS

| EP | 2525573 | 11/2012 |
|---|---|---|
| WO | WO2006108279 | 10/2006 |

* cited by examiner

*Primary Examiner* — Kevin Y Kim
(74) *Attorney, Agent, or Firm* — Pierson IP, PLLC (57) ABSTRACT

Embodiments disclosed herein provide systems and methods for blending real world choreographed media within a virtual world, wherein the choreographed real world media is inserted into a moving template within the virtual world. Embodiments utilize software and camera hardware configured to capture real world media, wherein the software may insert the real world media within a template to insert images of a user within the virtual world. Embodiments may allow media capturing choreographed movements to be placed within a moving template within the virtual world.

16 Claims, 12 Drawing Sheets

METHODS AND SYSTEMS FOR MERGING REAL WORLD MEDIA WITHIN A VIRTUAL WORLD

BACKGROUND INFORMATION

Field of the Disclosure

Examples of the present disclosure relate to techniques for merging real world media within a virtual world. More specifically, embodiments relate to inserting choreographed media with a user's likeness within a template positioned in a virtual world, wherein the template moves within the virtual world.

Background

A virtual world is a computer based environment populated with digital people, animals, objects, etc. A user may access the virtual world that presents perceptual stimuli to the user, who in turn can manipulate elements of the virtual world or be inserted into the virtual world. Thus, users may experience a degree of presence within the world.

Conventional technology allows a user to experience a virtual world by displaying virtual objects created by computer graphics in a space that uses virtual images as a background. In conventional systems, to blend real world media of a user within the virtual world either green screening or frame by frame media editing is required.

When using green screening, a dedicated screen room must be used. However, green screen rooms are prohibitively expensive for many consumers, while also requiring the user or real world objects to not wear green. Alternatively, to perform frame by frame editing, each frame is edited pixel by pixel by hand. This type of editing is extremely slow, tedious, and error prone.

Accordingly, needs exist for more effective and efficient methods to blend real world choreographed media within a virtual world, wherein the choreographed real world media is inserted into a moving template within the virtual world.

SUMMARY

Embodiments disclosed herein provide systems and methods for blending real world choreographed media within a virtual world, wherein the choreographed real world media is inserted into a moving template within the virtual world. Embodiments utilize software and camera hardware configured to capture real world media with a user's likeness, wherein the software may insert the real world media within the moving template over sequences of frames. Utilizing the template and the real world media, images of a user may be merged within the virtual world. Embodiments may allow media including choreographed movements of a user's likeness to be positioned within the moving template within the virtual world, such that the user's likeness is positioned within the template over sequences of frames.

In embodiments, an avatar within a virtual world may perform a choreographed sequence of movements within the virtual world, wherein, the avatar's location within the virtual world at various times may be predetermined. Based on the avatar's location within the virtual world, a template within the virtual world may be automatically created. The template may be a moving silhouette outline of the avatar's performance within the virtual world, wherein the template may be slightly larger than the avatar's size in the virtual world. Since the avatar's performance may result in changes in the shape, location, and size of the outline of the avatar, the template may continuously be changing in shape, location, and size to correspond with the changes to the outline of the avatar. Because the template has a specific location in the virtual world, the template may at times be partially or even wholly obscured by objects in front of it in the virtual world, while at other times not be obscured by the objects in the virtual world. The template of the choreographed performance within the virtual world may be utilized to create a reference video including a blank area outlined by the template.

Utilizing the camera hardware, which may be a smartphone, web camera, tablet, etc., the user may record a performance video including the user's likeness. The performance video may include a real world recording of the user performing the choreographed sequence of movements that the avatar performed in the virtual world. Next, the template within the reference video may be utilized to cut parts of the performance video into the reference video. This may result with the user's performance within the performance video being merged within the template in the virtual world of the reference video. In embodiments, the reference video may be overlaid on the performance video, such that only portions of the performance video positioned under the template may be viewed. This may achieve the effect of the user being located within the virtual world without having to edit the videos.

In embodiments, the performance video may be merged with the reference video in a plurality of different subsections, the boundaries of which are defined by match frame pairs. The beginning of each subsection is defined a match-frame pair, and the end is defined by another match-frame pair. A particular frame from the performance video forms a match-frame pair with a particular frame from the reference video, because they correspond to the same point in time in the choreography, as such the user within the performance video may be completing actions similar to the avatar in the reference video.

Utilizing a match-frame pair between the performance video and the reference video, the user may change, transform, or alter the performance video. For example, an x or y axis of the performance video may be changed such that the user's location within the performance video aligns with the template's location within the reference video. This may allow the user to simply and easily correct common, positioning, and/or sizing errors in the performance video, both in time and space, while also allowing the user to create a number of other useful effects, such as mirroring, enlarging, increasing and/or decreasing speed of movements, etc.

Additionally, embodiments may allow for ways to smoothly merge short choreographed performances into longer composites within the virtual world. This may require less work from the user and a more impressive resulting video within a virtual world. The merging of shorter performances may allow a user to create a user's performance within the virtual world appear to be created in a much larger space. Therefore, the merging of choreographed movements of a user in several performance videos may allow a user with a limited physical space to create an output video in a virtual world that appears to be performed in a much larger space.

In a specific embodiment, an original virtual world video may be obtained. The virtual world video may include an avatar, which is configured to perform predetermined movements within the virtual world. A reference video may be created with a template that corresponds to a positioning of the avatar at various frames or times throughout the reference video. The software may remove portions of the virtual world within the reference video positioned behind the template. Then, a user may record a performance video including the same choreography performed by the avatar in the reference video. The image of the user may be scaled to match the size of the template and/or avatar in the virtual world.

In embodiments, a first frame of the reference video may be matched to a first frame of the performance video, and the image of the user may be aligned with the template. The image of the user within the performance video may be aligned with the template within the reference video by vertically and/or horizontally moving the image of the user within the performance video. Then, a second frame of the reference video may be match within a second frame of the performance vide, and the image of the user may be aligned with the template, wherein the second frame is at a later point in time than the first frame. For example, the second frame occurs 5 seconds, 10 seconds, 1 minute, etc. after the first frame. Through corresponding match frame pairs throughout the reference video and the performance video, the alignment of the user with the template may be correct in space, speed, and time without he user having the alter each and every frame of the videos.

In embodiments, the merging of the performance video and the reference video with multiple match frame pairs throughout an output video may fix mismatches between positioning, speed, sizing, etc. between the user within the performance video and the template within the reference video, wherein.

In further embodiments, transformations of match frame pairs may quickly and efficiently generate special effects. For example, by combining multiple match frame pairs together and switching the vertical positioning of a template and the aligned user in a virtual world, the effect that a user jumps to a super-human height may be created.

In further embodiments, combining a plurality of matching frame pairs may allow a user to perform shorter choreographed movements while creating the appearance of a more complex output video.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Embodiments disclosed herein provide systems and methods for blending real world choreographed media with a virtual world, wherein the choreographed real world media is inserted into a moving template within the virtual world. Embodiments utilize software and camera hardware configured to capture real world media, wherein the software may insert the real world media within a template to insert images of a user within the virtual world. Embodiments may allow media capturing choreographed movements within a moving template within the virtual world.

Figure 1:
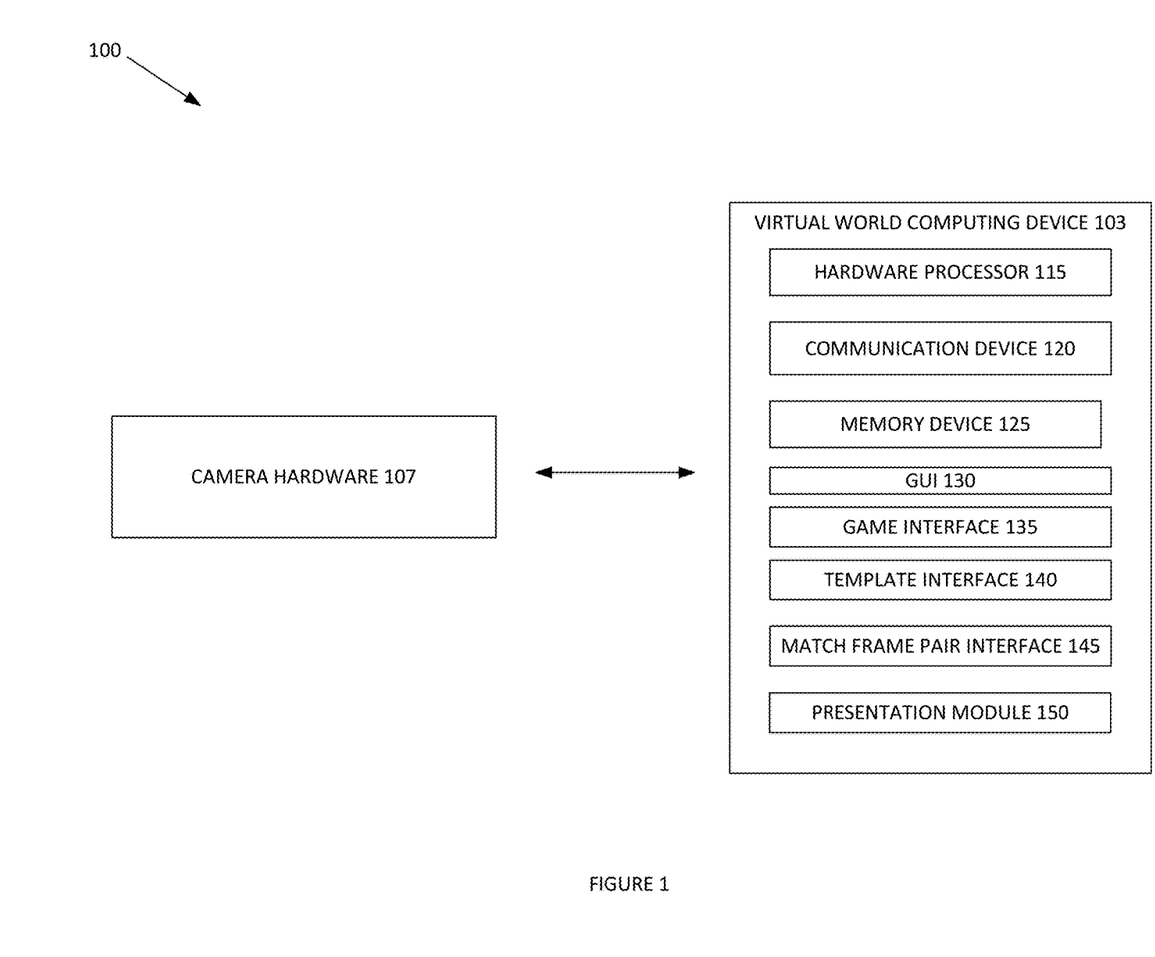
FIG. 1 depicts a system for merging a reference video and a performance video to create an output video, according to an embodiment.

Turning now to FIG. 1, FIG. 1 depicts a system 100 for merging a reference video and a performance video to create an output video, according to an embodiment. System 100 may include a virtual world computing device 103 and camera hardware 107.

Camera hardware 107 may be a device that is configured to record videos. For example, camera hardware 107 may be a camera located on a smart phone, web cam, tablet, etc. Camera hardware 107 may be an optical instrument configured to record frames, which may be stored on the memory device. The images may be sequences of frames comprising videos or movies. Utilizing the camera hardware 107, a performance video may be recorded. The performance video may include a recording of the user performing the choreographed sequence of movements that mimic the movements of an avatar in a virtual world. A template within the reference video may be utilized to cut and merge parts of the performance video including the user into the reference video. This may result in an output video with the user's performance being presented within the virtual world.

Virtual world computing device 103 may include a hardware processor 115, a communication device 120, memory device 125, graphical user interface 130, game interface 135, template interface 140, match frame pair interface 145, and presentation module 150.

Hardware processor 115 can include memory, e.g., read only memory (ROM) and random access memory (RAM), storing processor-executable instructions and one or more processors that execute the processor-executable instructions. In embodiments where hardware processor 115 includes two or more processors, the processors may operate in a parallel or distributed manner. Hardware processor 115 may execute an operating system of virtual world computing device 103 or software associated with other elements of virtual world computing device 103. In embodiments, hardware processor 115 may be configured to receive a reference video, create a template within the reference video for each of the frames within the reference video, and/or determine location data and time data associated with each of the frames within the reference video.

Communication device 120 may be a device that allows virtual world computing device 103 to communicate with another device, e.g., camera hardware 107. Communication device 120 may include one or more wireless transceivers for performing wireless communication and/or one or more communication ports for performing wired communication.

Memory device 125 may be a device configured to store data generated or received by virtual world computing device 103. Memory device 125 may include, but is not limited to a hard disc drive, an optical disc drive, and/or a flash memory drive. In embodiments, memory device 125 may be configured to store a reference video, store a template within the reference video for each of the frames within the reference video, and/or store location data and time data associated with each of the frames within the reference video.

Graphical user interface (GUI) 130 may be a device that allows a user to interact with virtual world computing device 103. While one GUI is shown, the term "user interface" may include, but is not limited to being, a touch screen, a physical keyboard, a mouse, a camera, a microphone, and/or a speaker. Utilizing GUI 130, a user may merge portions of the performance video into the template within the reference video.

Game interface 135 may be configured to create a virtual world comprised of a simulated space that is accessible by users Game interface 135 may also be configured to present the views of the virtual world to a user. In some instances, the virtual world may be a 2-dimensional topography. In other instances, the virtual world may be a 3-dimensional topography. The virtual world may have images, express ongoing real-time interaction by one or more users, and/or include one or more objects positioned within the images that are capable of being handled or moved within the virtual world. Objects in the virtual world can be 3D characters or objects, 2D objects, or secondary video projected onto 2D or 3D shapes. The secondary video may be an output video from previous match-frame pairs. These objects in the virtual 3D world can be in front of, and thus partially or wholly obscure, a part of the output video containing the performance video. The virtual world may include dimensions of the space, and/or surface features of a surface or objects that are "native" to the space. In some instances, the virtual world may describe a surface e (e.g., a wall) that runs through at least a substantial portion of the virtual space.

Template interface 140 may be configured to present an avatar within the virtual world within the reference video, wherein the avatar may be configured to perform a choreographed sequence of movements within the virtual world. Responsive to the avatar performing the choreographed sequence of events, template interface 140 may determine location data and time data associated with the positioning of the avatar in the virtual world at various frames associated with the reference video. Template interface 140 may be configured to create a template within the virtual world based on the avatar's location data and time data within the virtual world. The template may be a moving silhouette outlining the avatar's performance within the virtual world, wherein the template may be positioned at the same location at the same time as the avatar. In embodiments, the template may be larger than the avatar's size in the virtual world. Exactly how much larger may be a user-specified parameter, which may be adjustable. In addition, the template may be user-specified to be a different shape than the exact outline of the moving avatar. For example, if the choreography has the avatar doing a kick, but it is determined the user may not be able to kick as high, it may be advantageous to have the template extend the outline of the avatar more downward, to include the user's leg in the performance, even if the user is not kicking as high as the avatar. By making features associated with the template adjustable, the template can made larger than usual, wherein the larger template may better match the user's performance, such that the user's performance may be inserted into the template. The template of the choreographed performance within the virtual world may be utilized to create the reference video that includes a blank area outlined by the template. In embodiments, the template interface 140 may be able to create a convenient placement guide in both space and time within the virtual world via the template. This may allow for complex-looking and accurate-looking interactions between the user in the performance video and objects in the virtual world.

Match frame pair interface 145 may be configured to merge the performance video with the reference video in a plurality of different subsections to create an output video. To this end, utilizing match frame interface 145, match frame pairs may be determined between the reference video and the performance video, which may be a much faster and more efficient way of merging the user's likeness within the virtual world than traditional frame by frame editing.

Each subsection may be a match-frame pair for both the performance video and the reference video. In embodiments, a match-frame pair may occur at a same period of time during the choreography but may occur at different respective frames within the performance video and the reference video. Utilizing a match-frame pair between the performance video and the reference video, match frame pair interface 145 may transform the performance video, such as change the x or y axis of the performance video. This may allow the user's location within the performance video to align with the template's location at a given frame within the reference video. Accordingly, the user may simply and easily correct common errors in the performance video, both in time and space, while also allowing the user to perform a number of other useful effects, such as mirroring, enlarging, increasing and/or decreasing speed of movements, etc. The transformations within match-framing pairs allow an ordinary human performance to appear to be an extraordinary or significantly different performance in the virtual world in the output-video For example, when the user performs movements associated with the choreographed movements, the user may perform a simple vertical jump. However, the transformations between match pairs may rotate the user in the performance video so in the output-video it appears that the user has performed a somersault rather than a simple vertical jump.

Figure 8:
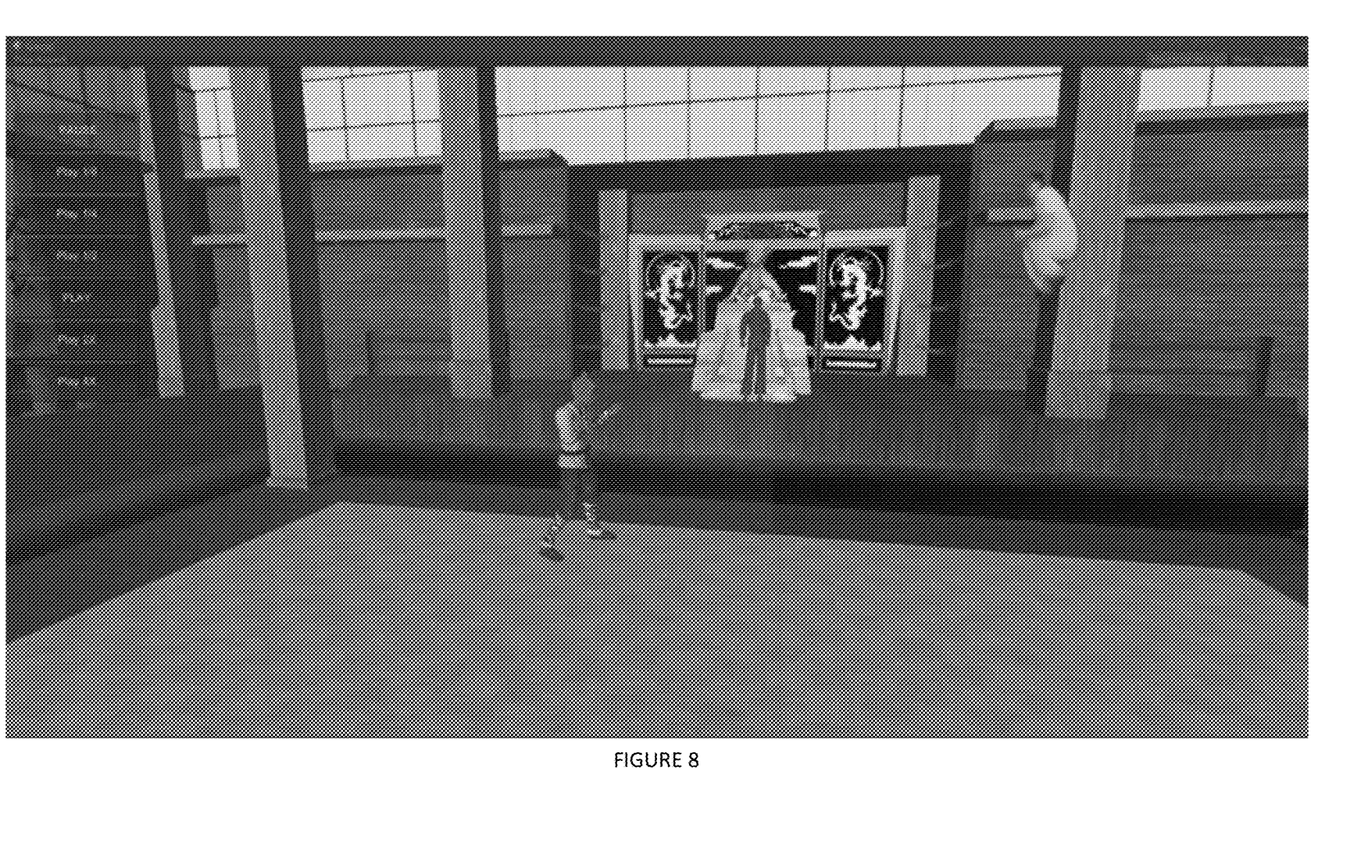
FIG. 8 depicts a frame of an output video, according to an embodiment.

Also, the transformations by the match-framing may raise the vertical height of the user's jump in the output video by slowing down the human performance in time and changing the vertical movement. Accordingly, the transformations may change a simple vertical jump to make the jump appear to be a superhuman jump with height and hang-time much greater than a real human can actually perform. One such example is depicted in FIG. 8.

In embodiments, match frame pair interface 145 may be configured to scale the sizing of the performance video such that the size of the user within the performance video is substantially the same size as the avatar and/or template within the reference video at a given time. Match frame pair interface 145 may present a video window to a user that includes a frame at a given time of the reference video, including the template. The video window may include a semi-transparent frame of the performance video overlaid on top of the frame of the reference video. The user may change the time data associated with the performance video and/or the reference video either forward or backwards to change the presented frames of either video. In embodiments, the user may independently change the time data associated with the performance video or the reference video. The user may change the time data associated with the performance video and/or the reference video either forward or backwards to change the presented frame of the performance video or the reference. In embodiments, the user may simultaneously change the time data associated with the performance video and the reference video, of independently change the time data associated with the performance video or the reference video. Therefore, the time data associated with the performance video or the reference video may be different. For example, the time data associated with the reference video may be set at frame ten, while the time data associated with the performance video may be set to frame twenty.

In embodiments, match frame pairs within an output video may not be combined from frames between a single reference video and a single performance. Thus, a plurality of reference videos and/or performances may be appended together in order to correctly follow the choreography.

Additionally, the same performance video and/or reference video may be used multiple times within an output video to create a longer output video. For example, an output video may include a first match frame pair segment and a second match frame pair segment, wherein the second match frame pair segment is a mirrored image of the first match frame pair.

More so, the choreography presented to the user by the avatar in the virtual world may be performed by the user in a plurality of performance videos rather than a single performance video. This may allow the user to perform the choreographed sequence in parts instead of the entire performance.

Presentation module 150 may be configured to present an output video to the user, wherein the output video includes a merger between the reference video and the performance video via the match frames pairs. In embodiments, responsive to determining each of the match frame pairs and the translations for each of the segments of the corresponding reference videos and performance videos, an output video may be automatically generated.

The output video may appear to have the user performing the predetermined choreographed routine, wherein the user's likeness replaces the avatar. To this end, the user's likeness may be portrayed in the virtual world, where the user's likeness may interact with objects in the virtual world in the same way the avatar interacted with the objects in the reference video. Because embodiments automatically generates the template within the reference video based on the location and time data associated with the avatar, only a minimal number of manual interventions for a number of match-frame pairs per output video may be required. In general, the number of match frame pairs associated with an output video may be much smaller than the number of frames in the video. For example, an output video may have a match frame pair for every ten frames of an output video. Also, the operations done for each of the match frame pairs may be much simpler than the operations needed for each frame in frame-by-frame editing. As such, embodiments greatly increase the hardware's efficiency of a computing device that produces output videos with the user's likeness.

In addition, presentation module 150 allows a real-time 3D presentation of the virtual world, where a user may walk through the 3D world, including one or more templates where one or more performance videos are shown. The templates contain 2D video, which appear flat in the 3D virtual world. However, in performing a walk through the virtual 3D world, it is desired to present the templates with the 2D video to appear as if they were 3D objects. That is, it is desirable for believability to add three dimensionality to the templates utilizing the 2D performance videos.

In particular, the 2D performance video may be presented to look correct if viewed head-on in the virtual 3D world. However, if the virtual world within the reference video is presented as a 3D world and one views the 2D performance video at a right angle (90 degrees), the flat 2D nature of the template becomes obvious, because the template viewed from the side becomes vanishingly thin and flat. To obviate this issue, embodiments incorporate a "fake 3 dimensionality" to such scenarios, to allow a more believable walk through the 3D world by various methods.

In a first method, the flat template is rotated smoothly and slightly so a sideways view of the virtual world appears more head-on. For example, if the user views the avatar at 90 degrees, the template may be rotated 30 degrees so that instead of looking vanishingly thin, it has some width to add more perspective. The embodiments may not rotate the template a full 90 degrees, this may enable a compromise between adding 3dimensionality and direction correctness. For example, if the performance video within a template is performing a punch in the North direction, if the template with the reference video is rotated by 90 degrees, the punch may now point in the West direction. This may appear incorrect to the user in the reference video. By compromising between "adding 3dimensionality" and "direction correctness", embodiments make the action in the output video look believably correct, while adding some 3dimensionality.

Figure 9:
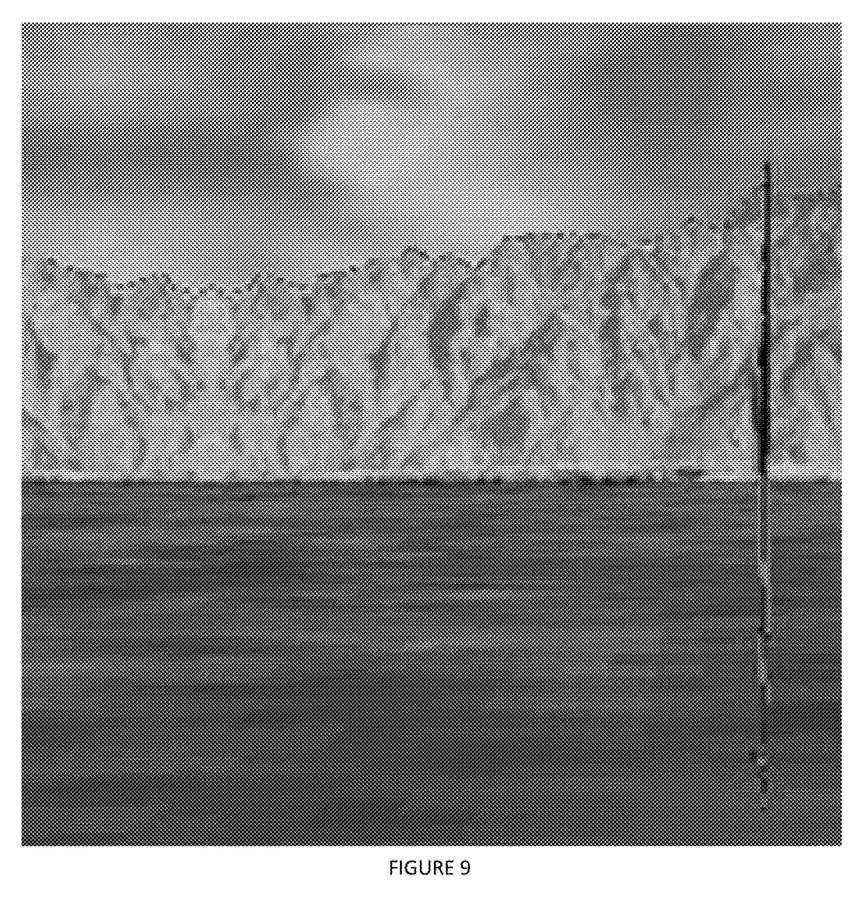
FIG. 9 depicts a walk through of a 3D world where the flat template is viewed at 88 degrees without 3dimensionality rotation, according to an embodiment.

FIG. 9 depicts a walk through of a 3D world where the flat template is viewed at 4 88 degrees without "3 dimensionality rotation," according to an embodiment.

Figure 10:
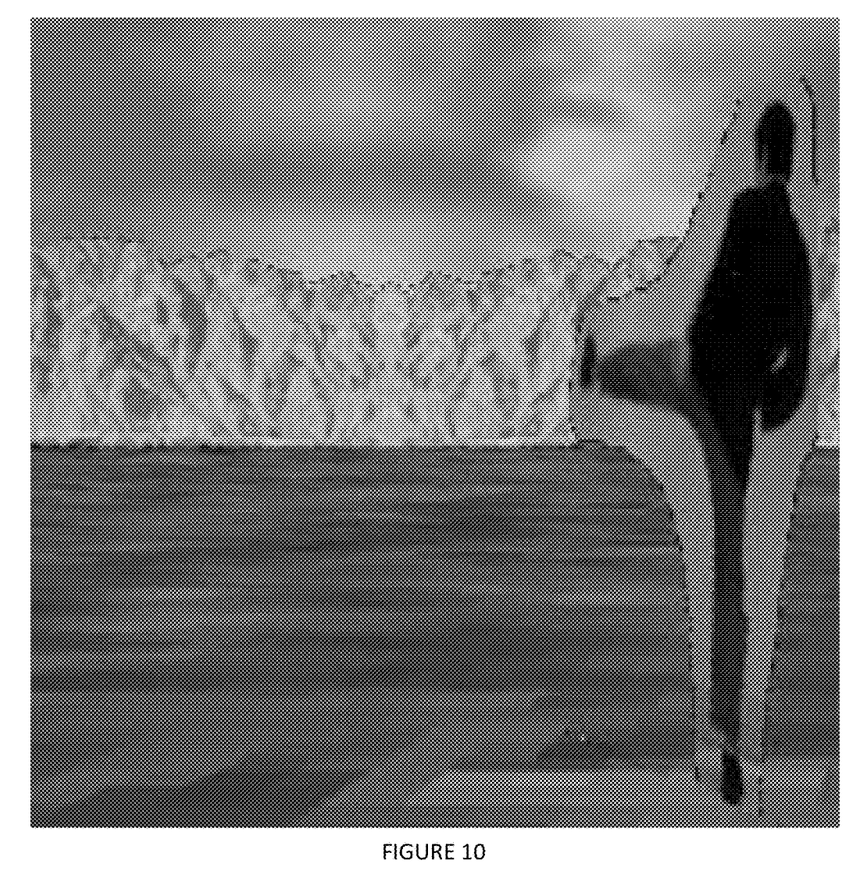
FIG. 10 depicts a walk through of a 3D world where the flat template is viewed at 88 degrees with 3dimensionality rotation, according to an embodiment.

FIG. 10 shows a walk through of a 3D world where the flat template is viewed at 88 degrees with "3dimensionality rotation," according to an embodiment.

In a second method, the shape of the template may be warped to add 3 dimensionality. The template may appear to be a flat "screen" in the 3D world, since it is showing a 2D performance video. However, it is advantageous for believability to warp the flat screen shape into a shape like the left half of the letter "U" (if the template is viewed from top), when in embodiments a walk through is completed where the user is viewing the template to his left side. The warping is ideally a smooth curve, but it may be approximated by flat polygons for ease of rendering. This may add "fake 3dimensionality" to the flatness of the template, viewed from the user. Embodiments may bend the shape of the template on the half closest to the user, without bending the shape of the template on the other half, to avoid a problem with the back of the template showing up. That is, if the user were to see the back of the template, it may appear "incorrect", because the 2D performance video may be presented from a front angle, and there may be a discontinuous jump in the video where parts of the back of the video is adjacent to parts of the front of the video. Embodiments avoid this issue by bending only the half of the template closest to the user, and also by limiting the view angles the user can see of the templates in the 3D world so at most you can see the templates at 90 degrees, but no greater. In embodiments, it may be is forbidden in the walk through to see the back of the templates, by for example, having a viewing angle greater than 90 degrees. If embodiments bend the template on both sides (looking like the bottom half of the letter "U" when viewed from top), it would be possible for the user to see parts of the back of the template when viewed from angles such as 90 degrees or less.

Figure 11:
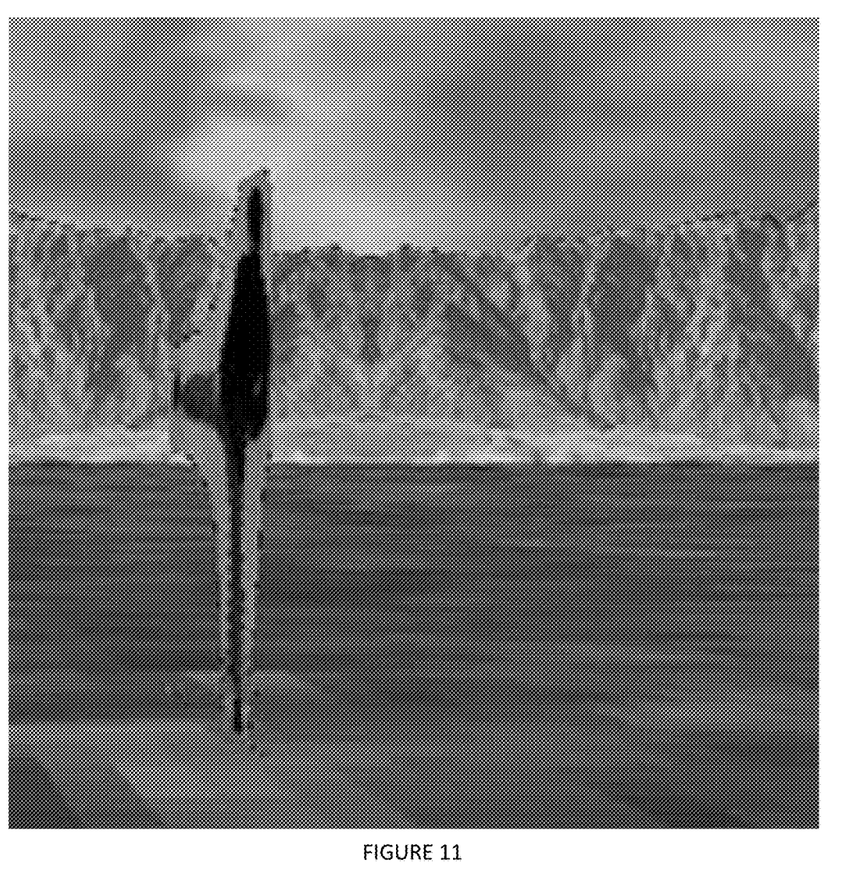
FIG. 11 depicts a walk through of a 3D world where the flat template is viewed at 80 degrees without 3dimensionality warping, according to an embodiment.

FIG. 11 depicts a walk through of a 3D world where the flat template is viewed at 88 degrees without "3dimensionality warping," according to an embodiment.

Figure 12:
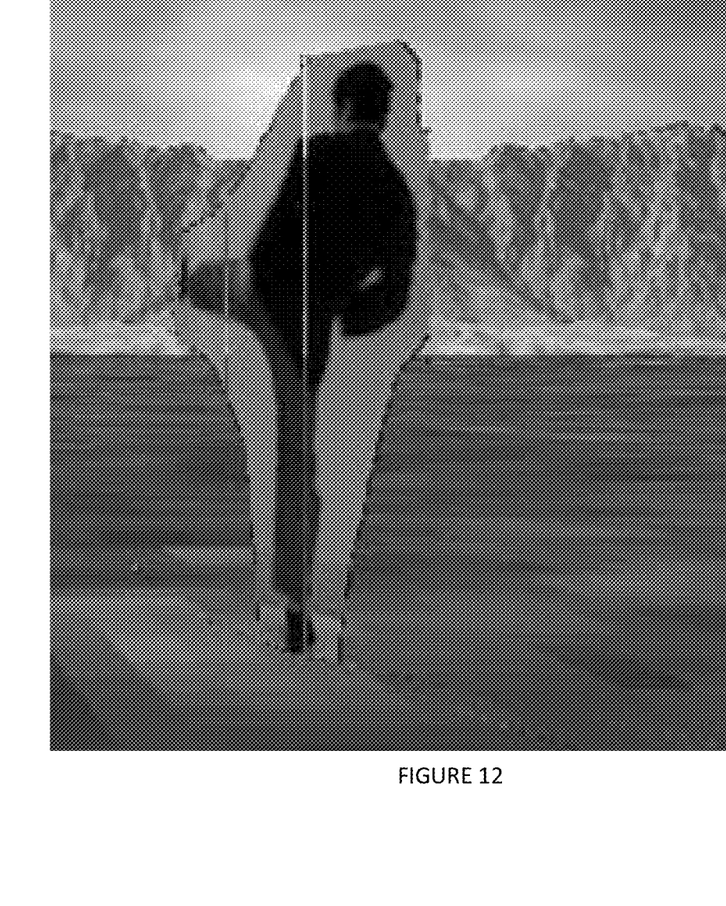
FIG. 12 depicts a walk through of a 3D world where the flat template is viewed at 80 degrees with 3dimensionality warping, according to an embodiment.

FIG. 12 depicts a walk through of a 3D world where the flat template is viewed at 88 degrees with "3dimensionality warping," according to an embodiment. The warped template is shaped like the left half of the letter "U" (if the template is viewed from top), where the curve is approximated roughly by a number of flat polygons.

Both of these effects, the rotation and the warping, is nonexistent if the user is viewing the templates head-on, and then is smoothly and imperceptibly applied when the user smoothly changes his point of view. As such, both of these effects smoothly change the templates without any noticeable jumps in appearance when the user walks through the 3D world.

Figure 2:
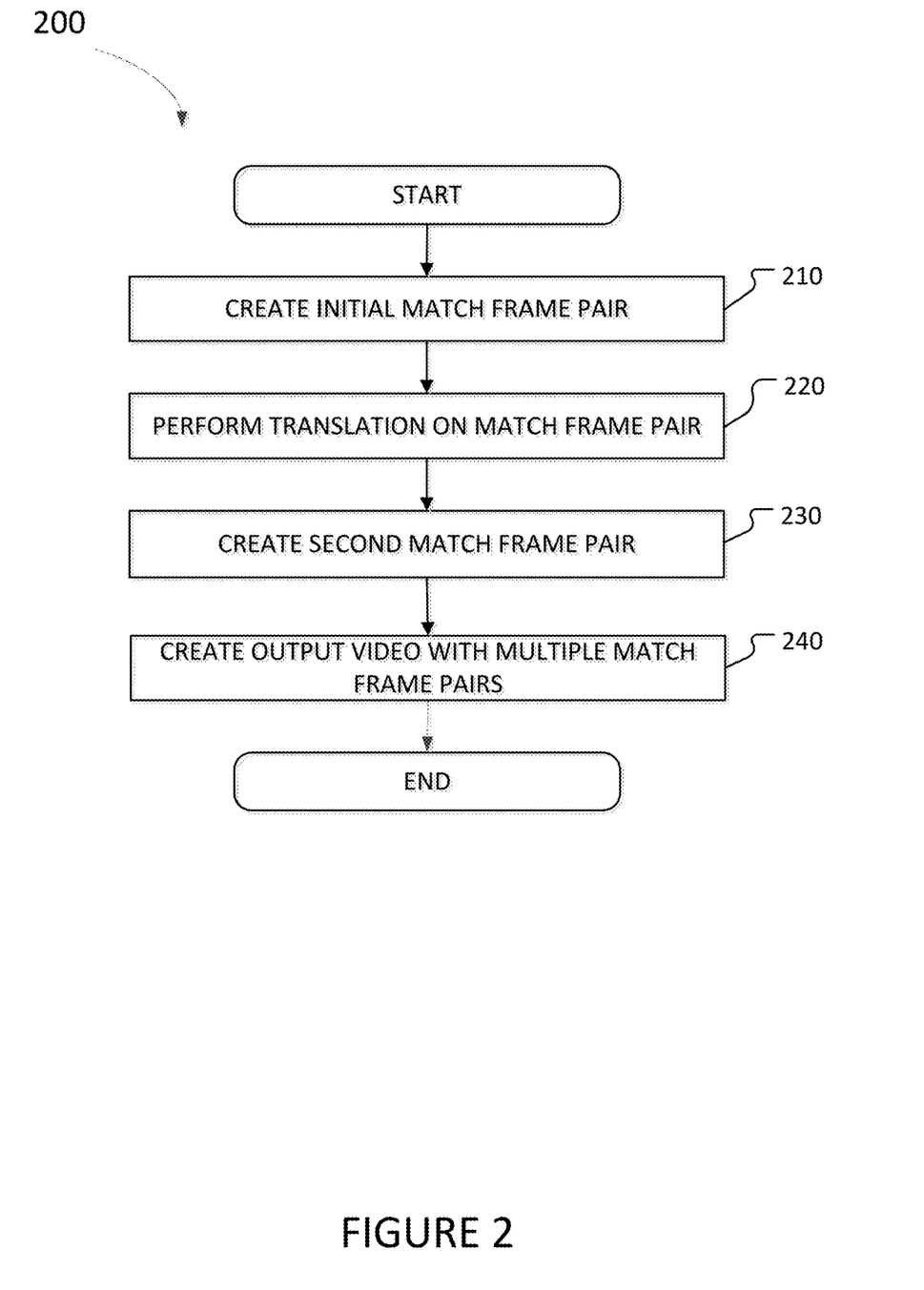
FIG. 2 illustrates a method for merging media including a user into a virtual world, according to an embodiment.

FIG. 2 illustrates a method 200 for merging media including a user into a virtual world utilizing system 100. The operations of method 200 presented below are intended to be illustrative. In some embodiments, method 200 may be accomplished with one or more additional operations not described, and/or without one or more of the operations discussed. Additionally, the order in which the operations of method 200 are illustrated in FIG. 2 and described below is not intended to be limiting.

In some embodiments, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At operation 210, a user may utilize match frame pair interface 145 to create an initial match frame pair at a location wherein the image of the user within the performance video corresponds with the template within the reference video. This may occur at different time data for the reference video and the performance video. For example, frame zero of the reference video may correspond to frame seven of the performance video to create a first match frame pair of 0:7.

At operation 220, a user may utilize GUI 130 to align the positioning data of the user within the performance frame with the positioning data of the template within the reference frame. For example, the user within the performance frame may be vertically, horizontally, etc. moved such that the user within the performance video is aligned with the template in the reference video. This movement, horizontally or vertically, may be a two dimensional translation of the performance video frame, which may be a subset of a movements referred to as two dimensional transformations of the performance video frame. Other types of two dimensional transformations that may be utilized to move the user within the performance frame to be aligned within the template within the reference frame may include mirroring, scaling, rotation, etc.

At operation 230, a second match frame pair may be determined, wherein the second match frame pair may have an increase in time data for both the performance video and the reference video. For example, frame ten of the reference video may correspond to frame fifteen of the performance video to create a second match frame pair of 10:15. In embodiments, the frames in the second match frame pair may have a different distance between them, which may include more frames and/or seconds of time. For example, the distance in the first match frame pair may be seven frames and/or seconds of time, whereas the distance in the second match frame pair may be five frames and/or seconds of time. Accordingly, the advancement of the reference video may occur at a different rate than the performance video. This may occur based on the user performing the choreographed sequence at a different speed than the avatar performing the same choreographed sequence. In other words, when going from the first match frame pair to the second match frame pair, the reference video may move a distance of ten frames from frame zero to frame ten, but the performance video may move a distance of only eight frames from frame seven to frame fifteen.

At operation 240, an output video may be created including a plurality of match frame pairs. Because embodiments may create the output video where the user's performance within the performance video replaces the 3D character in the reference video smoothly, embodiments may slow down the performance video in the section between the first match frame pair and the second match frame to produce an output video that appears like the user performed the movements in this part of the merged output video at exactly the same speed as avatar performed the same movements in the reference video. Thus, embodiments may change the speed and positioning of the user performance to match the avatar's reference performance. This allows the user to appear to interact with the 3D world objects in the output video in the virtual world.

Figure 3:
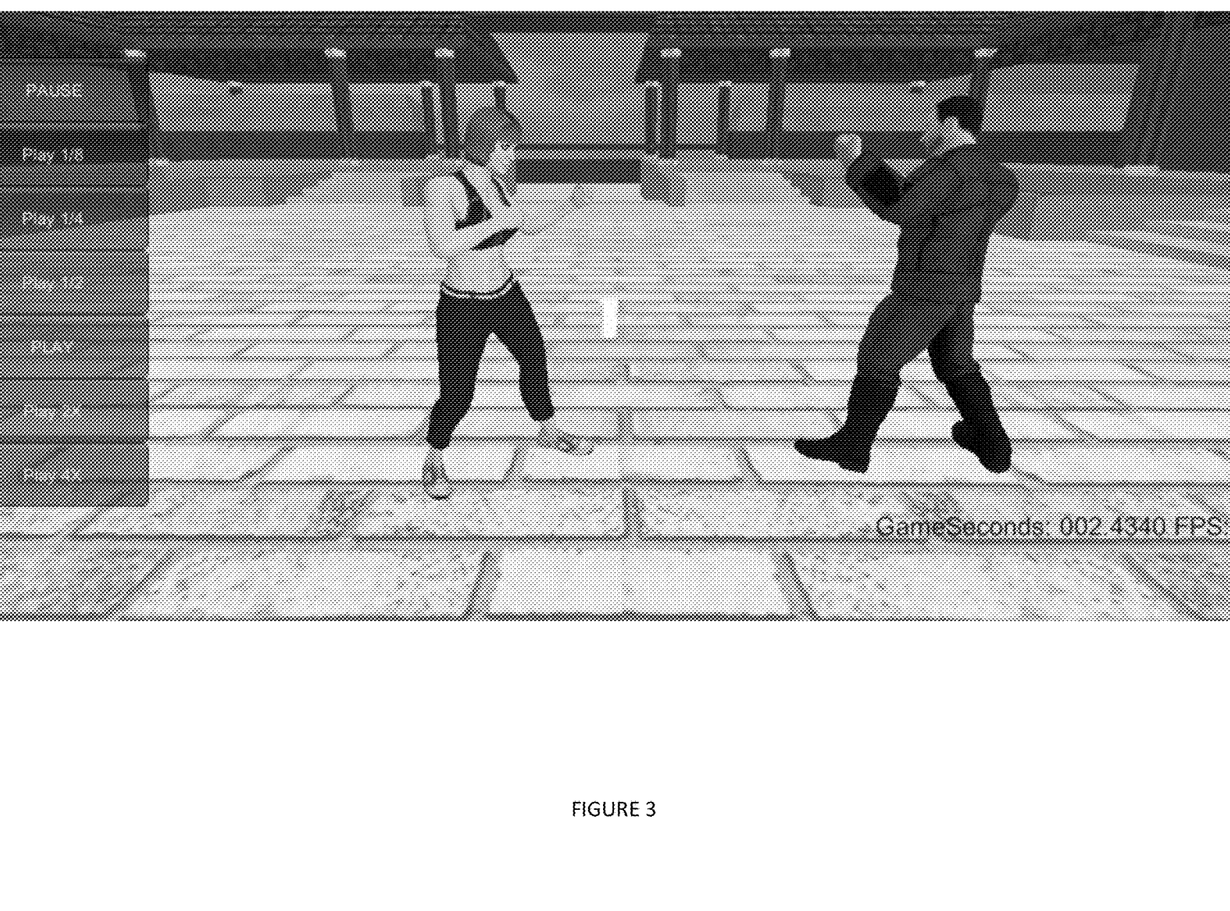
FIG. 3 depicts a frame of a reference video, according to an embodiment.

FIG. 3 depicts an embodiment of a frame of a reference video, according to an embodiment. As depicted in FIG. 3, a frame of the reference video may include an avatar. In embodiments, the reference video may include multiple frames including a choreographed performance by the avatar.

Figure 4:
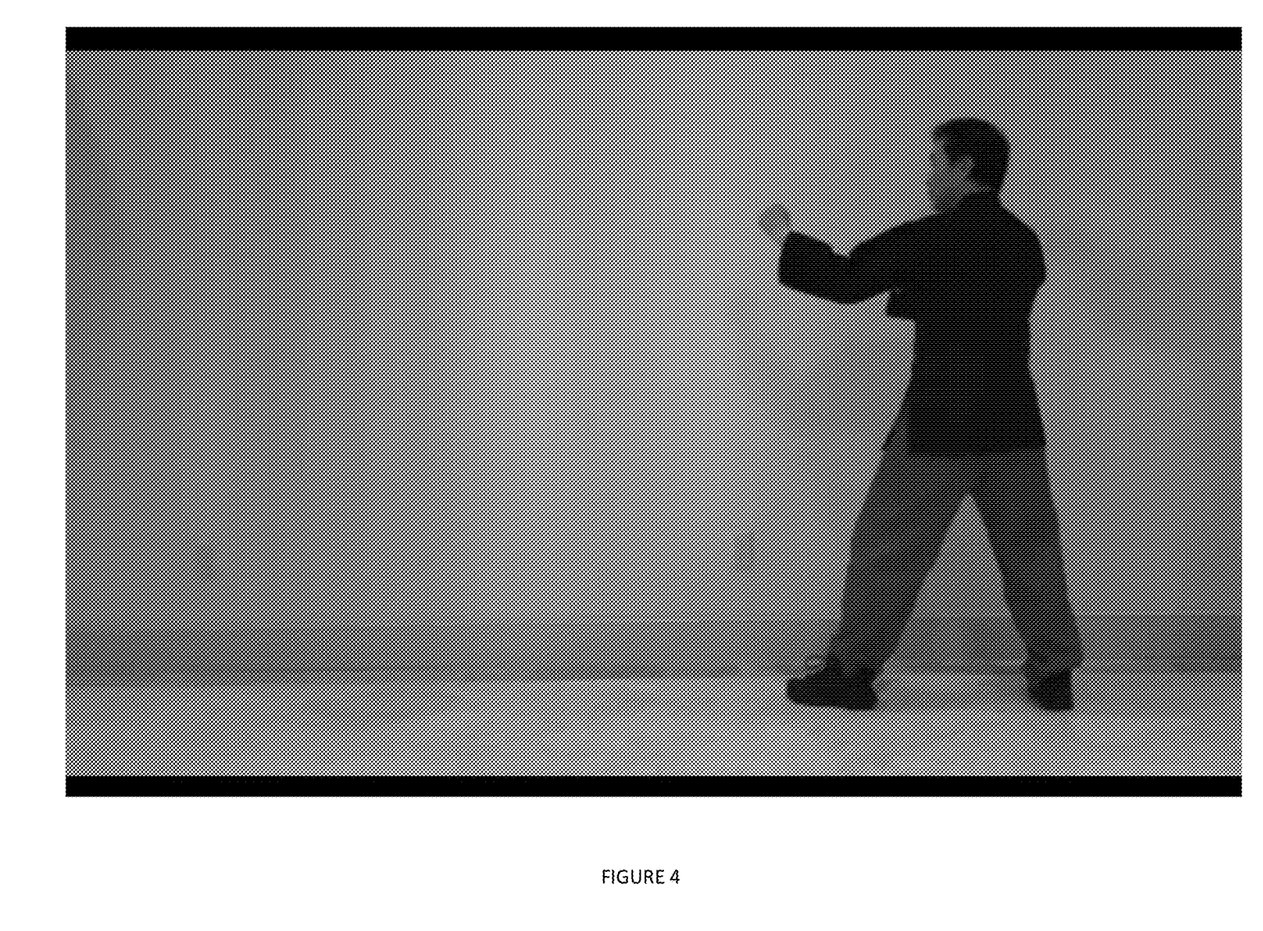
FIG. 4 depicts a frame of a performance video, according to an embodiment.

FIG. 4 depicts an embodiment of a frame of a performance video, according to an embodiment. As depicted in FIG. 4, a frame of the performance video may include a user performing movements corresponding to the choreography of the avatar in a reference video. In embodiments, the performance video may include multiple frames including a choreographed performance by the user corresponding to the performance by the avatar.

Figure 5:
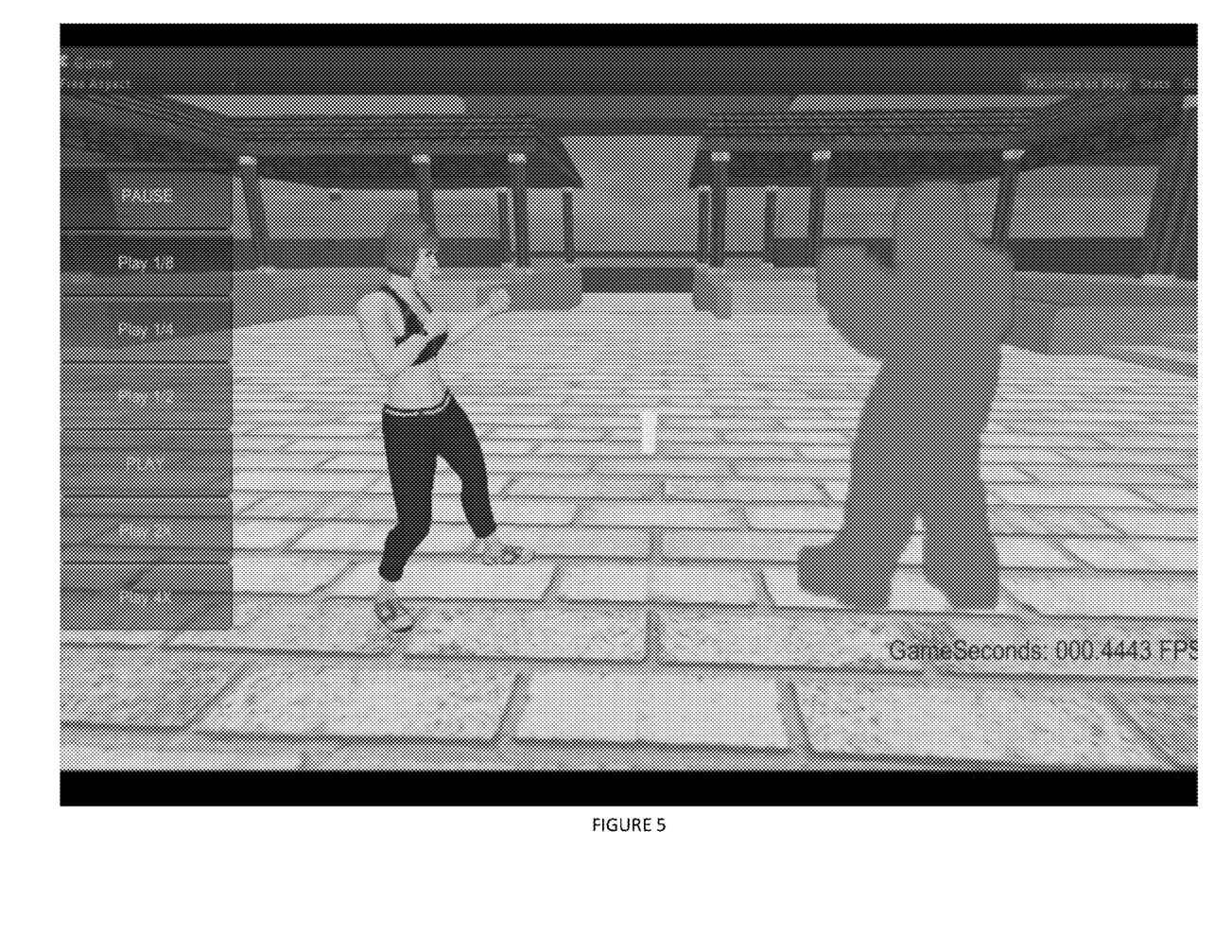
FIG. 5 depicts a frame of a reference video, according to an embodiment.

FIG. 5 depicts an embodiment of a frame of a reference video, according to an embodiment. As depicted in FIG. 5, a frame of the reference video may include a template in place of the avatar. In embodiments, the template may be automatically generated for each frame of the reference video based on time and location data of the avatar within the virtual world.

Figure 6:
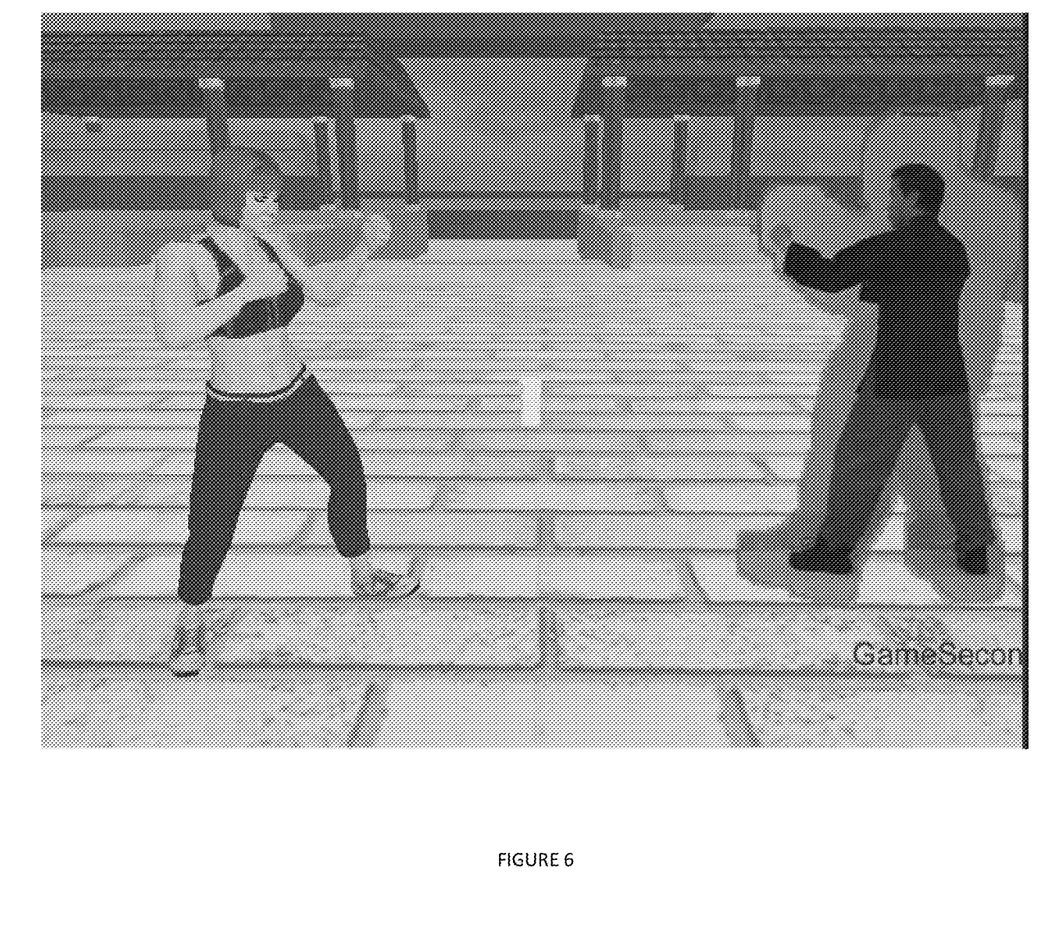
FIG. 6 depicts a frame of an output video, according to an embodiment.

FIG. 6 depicts an embodiment of a frame of an output video, according to an embodiment. As depicted in FIG. 6, a frame of the output video may include a merging of a frame of the performance video and the reference video, wherein the user's likeness is positioned within the template.

Figure 7:
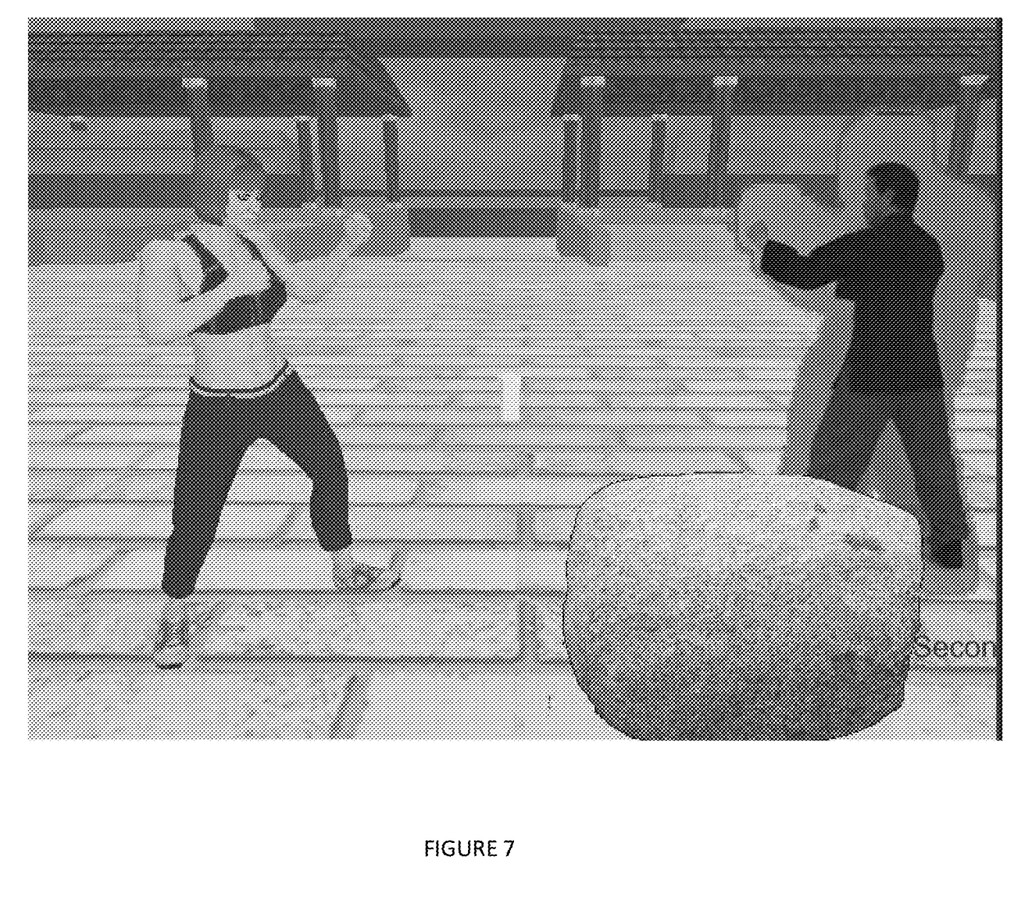
FIG. 7 depicts a frame of an output video under different circumstances.

FIG. 7 depicts an embodiment of a frame of an output video under different circumstances. This frame is identical to the situation in which FIG. 6 was generated, except the virtual 3D world had a rock in the foreground in front of the template. FIG. 7 demonstrates the template has a specific position in the virtual world, and objects in front of it can partially or wholly obscure it. As further depicted in FIG. 7, the real world representation of the user may be presented within the template in the reference video, wherein the real world representation of the video may not be identically sized/shaped as the template. This may allow for discrepancies between the reference performance and the user performance.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present invention may be embodied as an apparatus, method, or computer program product. Accordingly, the present embodiments may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

The flowcharts and block diagrams in the flow diagrams illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce a software methodology which implement the function/act specified in the flowcharts and/or block diagrams.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for merging real world media into a virtual world, the system comprising:
    a camera configured to record a performance video including frames, wherein the performance video includes real world movements of a user, the performance video including first time data corresponding with a performance frame zero;
    a game interface configured to create a virtual world including a moving avatar within a reference video, the reference video including second time data corresponding with a reference frame zero;
    a template interface configured to create a template within the virtual world based on movement of the avatar, the template being a blank area within the virtual world;
    a match frame pair interface configured to transform the performance video such that the real world movements of the user align with the template based on the movement of the avatar, wherein the match frame pair interface is configured to create an initial match frame pair at a location where an image of the user within the performance video aligns with the template within the reference video, wherein the first time data associated with the performance video corresponds with a different frame number than the second time data;
    a second match frame pair, the second match frame pair associated a second frame of the performance video with a second frame of the reference video, wherein the second match frame pair includes third time data associated with the second frame of the performance video and fourth time data associated with the second frame of the reference video, wherein a number of frames between the performance frame zero and the second frame of the performance video is different than a number of frames between the reference frame zero and the second frame of the reference video.

2. The system of claim 1, wherein the performance video includes first positioning data and the reference video includes second positioning data.

3. The system of claim 2, further including:
a graphical user interface configured to alter the performance video, wherein via the graphical user interface the user is configured to align the first positioning data of the user within the performance video with the second positioning data associated with a location of the template within the reference video.

4. The system of claim 1, wherein an output video is created including a plurality of match frame pairs, wherein the plurality of match frame pairs include the first match frame pair and the second match frame pair.

5. The system of claim 1, wherein the template is a larger size than the avatar in the virtual world.

6. The system of claim 5, wherein the template is positioned at a same location as the avatar within the virtual world.

7. The system of claim 1, wherein the template is configured to be rotated in the virtual world, wherein a first degree of rotation of the template within the virtual world is less than a second degree of rotation of the avatar within the virtual world.

8. The system of claim 1, wherein the template is configured to be warped to add three dimensionality in the virtual world.

9. A method for merging real world media into a virtual world, the method comprising:
recording a performance video including frames, wherein the performance video includes real world movements of a user, the performance video including first time data corresponding with a performance frame zero;
creating a virtual world including a moving avatar within a reference video, the reference video includes second time data corresponding with a reference frame zero;
creating a template within the virtual world based on movement of the avatar, the template being a blank area within the virtual world;
transforming, via a match frame pair interface, the performance video such that the real world movements of the user align with the template based on the movement of the avatar, wherein the match frame pair interface is configured to create an initial match frame pair at a location where an image of the user within the performance video aligns with the template within the reference video, wherein the first time data associated with the performance video corresponds with a different frame number than the second time data
creating, via the match frame pair, a second match frame pair, the second match frame pair associated a second frame of the performance video with a second frame of the reference video, wherein the second match frame pair includes third time data associated with the second frame of the performance video and fourth time data associated with the second frame of the reference video, wherein a number of frames between the performance frame zero and the second frame of the performance video is different than a number of frames between the reference frame zero and the second frame of the reference video.

10. The method of claim 1, wherein the performance video includes first positioning data and the reference video includes second positioning data.

11. The method of claim 10, further including:
altering, via a graphical user interface, the performance video to align the first positioning data of the user within the performance video with the second positioning data associated with a location of the template within the reference video.

12. The method of claim 1, further comprising:
creating an output video including a plurality of match frame pairs, wherein the plurality of match frame pairs include the first match frame pair and the second match frame pair.

13. The method of claim 9, wherein the template is a larger size than the avatar in the virtual world.

14. The method of claim 13, further comprising:
positioning the template at a same location as the avatar within the virtual world.

15. The method of claim 9, further comprising:
rotating the template in the virtual world, wherein a first degree of rotation of the template within the virtual world is less than a second degree of rotation of the avatar within the virtual world.

16. The method of claim 9, further comprising:
warping the template to add three dimensionality in the virtual world.

* * * * *